(12) United States Patent
Zhang et al.

(10) Patent No.: US 11,584,027 B2
(45) Date of Patent: Feb. 21, 2023

(54) JOINT OF COLLABORATIVE ROBOT, AND HOUSING THEREFOR

(71) Applicant: RETHINK ROBOTICS GMBH, Bochum (DE)

(72) Inventors: Sheng Zhang, Hebei (CN); Ji Long Yao, Beijing (CN)

(73) Assignee: Rethink Robotics GMBH, Bochum (DE)

( * ) Notice: Subject to any disclaimer, the term of this patent is extended or adjusted under 35 U.S.C. 154(b) by 0 days.

(21) Appl. No.: 17/280,044

(22) PCT Filed: Sep. 26, 2018

(86) PCT No.: PCT/CN2018/107736
§ 371 (c)(1),
(2) Date: Mar. 25, 2021

(87) PCT Pub. No.: WO2020/061854
PCT Pub. Date: Apr. 2, 2020

(65) Prior Publication Data
US 2022/0032479 A1    Feb. 3, 2022

(51) Int. Cl.
*F16H 57/02* (2012.01)
*B25J 17/00* (2006.01)
*B25J 9/00* (2006.01)
*B25J 19/00* (2006.01)
*B33Y 80/00* (2015.01)

(52) U.S. Cl.
CPC ............. *B25J 17/00* (2013.01); *B25J 9/0009* (2013.01); *B25J 19/0054* (2013.01); *B33Y 80/00* (2014.12)

(58) Field of Classification Search
CPC ...... F16H 2057/02; F16H 57/02; B33Y 80/00; B25J 17/00; B25J 9/0009
See application file for complete search history.

(56) References Cited

U.S. PATENT DOCUMENTS

| 2013/0064979 | A1 | 3/2013 | McAlister |
| 2015/0122073 | A1 | 5/2015 | Maisonnier |
| 2018/0243926 | A1 | 8/2018 | Gerhard |

FOREIGN PATENT DOCUMENTS

| CN | 10 387 4655 A | 6/2014 |
| CN | 107 448 528 A | 12/2017 |
| CN | 10 790 1078 A | 4/2018 |
| CN | 10 790 3555 A | 4/2018 |

(Continued)

OTHER PUBLICATIONS

Metallurgy Matters: The structure of metal, by Bob Capudean on Apr. 24, 2003 and published online at https://www.thefabricator.com/thewelder/article/metalsmaterials/the-structure-of-metal (Year: 2003).*

(Continued)

*Primary Examiner* — Randell J Krug
(74) *Attorney, Agent, or Firm* — Workman Nydegger

(57) ABSTRACT

A housing of a joint of a collaborative robot, where at least part of the material of the housing is configured to include a plurality of lattice structure units. Since the at least part of the material of the housing is configured to include the plurality of lattice structure units, the weight of the joint may be reduced with respect to a completely solid housing. Further disclosed is the joint of the collaborative robot.

12 Claims, 3 Drawing Sheets

(56) References Cited

FOREIGN PATENT DOCUMENTS

| CN | 10 790 4449 A | 4/2018 | |
|---|---|---|---|
| CN | 107 921 648 A | 4/2018 | |
| CN | 106 272 453 B | 9/2018 | |
| DE | 202004008156 U1 * | 8/2004 | .......... B25J 19/0075 |
| JP | 2003-046038 A | 2/2003 | |
| JP | 2003-183792 A | 7/2003 | |
| JP | 6 272837 B2 | 1/2018 | |
| WO | 2017/112406 A1 | 6/2017 | |
| WO | WO-2017163070 A1 * | 9/2017 | .......... F16C 33/6677 |

OTHER PUBLICATIONS

International Search Report dated Jan. 21, 2019, filed in PCT Application No. PCT/CN2018/107736, filed Sep. 26, 2018.
European Search Report dated May 16, 2022, issued in EP Application No. 18934852.7.

* cited by examiner

JOINT OF COLLABORATIVE ROBOT, AND HOUSING THEREFOR

TECHNICAL FIELD

The present invention relates to the technical field of robots, and in particular, to a joint of a collaborative robot, and a housing therefor.

BACKGROUND

A collaborative robot has the characteristics of being safe, flexible, convenient to use and the like, and therefore, the collaborative robot has wide application prospects in the future industrial field. As a key component of the collaborative robot, the performance of a joint has a great influence on the performance of the collaborative robot. Weight is an important performance index of the joint, and lightweight optimization of the weight of the joint may significantly reduce the weight of the collaborative robot. Therefore, how to realize the lightweight of the joint is an important problem to be solved in joint design.

SUMMARY

In this regard, the objective of the present invention is to provide a joint of a collaborative robot, and a housing thereof, capable of realizing the lightweight of the joint.

The present invention provides a housing of a joint of a collaborative robot, where at least part of the material of the housing is configured to include a plurality of lattice structure units. In embodiments of the present invention, since the at least part of the material of the housing is configured to include the plurality of lattice structure units, the weight of the joint may be reduced with respect to a completely solid housing.

In some embodiments, the plurality of lattice structure units are uniformly distributed in the at least part of the material of the housing. For example, the plurality of lattice structure units are distributed in the at least part of the material of the housing in a joining manner. In embodiments of the present invention, the plurality of lattice structure units are uniformly distributed in the at least part of the material of the housing, so that the at least part of the material exhibits uniformity and consistency.

In some embodiments, each lattice structure unit is a polyhedron formed by connecting a plurality of bar-like structure portions, for example, each lattice structure unit is a tetrahedral lattice structure unit or a hexahedral lattice structure unit formed of the plurality of bar-like structure portions. In embodiments of the present invention, each lattice structure unit is a polyhedron, for example, a tetrahedron or a hexahedron, thereby realizing structure optimization of the lattice structure units.

In some embodiments, an inner surface portion of the housing in contact with or near a heat generating component included in the joint of the collaborative robot is made of the at least part of the material. In embodiments of the present invention, the inner surface portion of the housing in contact with or near the heat generating component is configured to include the plurality of lattice structure units, so that the heat dissipation of the heat generating component in the housing is improved.

In some embodiments, a thermally conductive medium is filled in each lattice structure unit. In embodiments of the present invention, the thermally conductive medium is filled in each lattice structure unit, so that the thermal conductivity of the housing is improved.

In some embodiments, each lattice structure unit has a size on the order of micrometers.

In some embodiments, the housing is made by an additive manufacturing process. In embodiments of the present invention, the housing is made by the additive manufacturing process, and therefore, it is simple and easy to implement.

The present invention provides a joint of a collaborative robot, where the joint includes the housing. The joint provided in embodiments of the present invention includes the housing. Since the at least part of the material of the housing is configured to include the plurality of lattice structure units, the weight of the joint may be reduced with respect to a completely solid housing.

BRIEF DESCRIPTION OF THE DRAWINGS

Preferred embodiments of the present invention are described in detail below with reference to accompanying drawings, so that persons skilled in the art can understand more clearly the foregoing and other features and advantages of the present invention. In the drawings.

Figure 1:
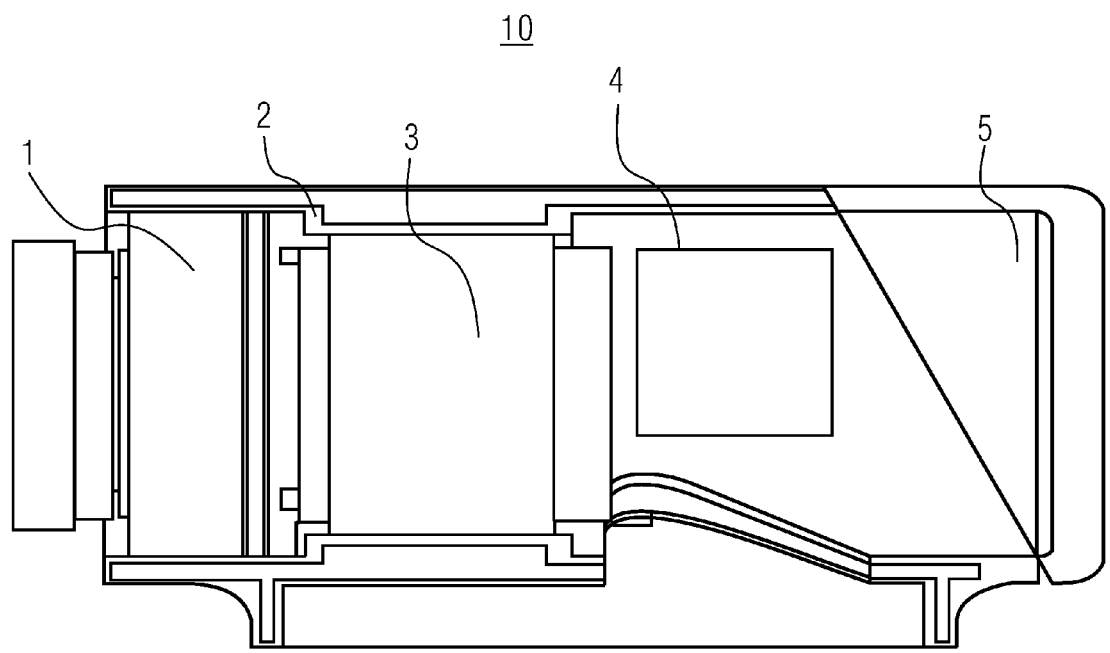
FIG. 1 is a schematic diagram of a detailed structure of a joint of a collaborative robot according to an embodiment of the present invention.

Reference numerals are as follows:

| | |
|---|---|
| Joint | 10 |
| Harmonic gear | 1 |
| Housing | 2 |
| Motor | 3 |
| Electrical component | 4 |
| Rear cover | 5 |
| A plurality of lattice structure units in housing | 2A |
| Solid structure in housing | 2B |
| One lattice structure unit | 100 |
| Interior of one lattice structure unit | 200 |
| A plurality of bar-like structure portions of one lattice structure unit | 101-103 |
| Joint of a plurality of bar-like structure portions | 104 |

DETAILED DESCRIPTION

In order to have a clearer understanding of the technical features, objectives and effects of the present invention, particular embodiments of the present invention now are explained with reference to the accompanying drawings, in which identical reference numerals indicate structurally identical components or components with similar structures but identical functions.

"Schematic" herein means "serving as an instance, example or illustration". No drawing or embodiment described herein as "schematic" should be interpreted as a more preferred or more advantageous technical solution.

To make the drawings uncluttered, only those parts relevant to the present invention are shown schematically in the drawings; they do not represent the actual structure thereof as a product. In addition, to make the drawings uncluttered for ease of understanding, in the case of components having the same structure or function in certain drawings, only one of these is drawn schematically, or only one is marked.

On one hand, the present invention provides a housing of a joint of a collaborative robot, where at least part of the material of the housing is configured to include a plurality of lattice structure units.

It may be understood that the at least part of the material of the housing may be part of the material of the housing or all of the material of the housing. The at least part of the material of the housing is configured to include the plurality of lattice structure units, which may be understood as meaning that the at least part of the material of the housing is configured as a lattice structure.

In practical applications, the housing may be formed using an additive manufacturing process, such as a 3D printing technology. By using the 3D printing technology, the housing may be made into an integral structure. Specifically, 3D printing can be carried out on a metal material to obtain a housing of a metal material, thereby facilitating heat dissipation. The 3D printing technology may realize maximum optimization of the housing structure, may optimize the housing to any shape, and may easily enable a part of the housing to be a lattice structure and the other part to be a solid structure. Moreover, the lattice structure part and the solid structure part are integral. In practical applications, since the housing is required to be designed to have sufficient strength, rigidity, and thermal conductivity, in consideration of the lightweight and material costs, aluminum alloy may be adopted to manufacture the joint housing. Since the at least part of the material of the housing is a lattice structure, the rigidity-to-weight ratio of the housing is improved.

It may be understood that the lattice structure units in the housing are not a microscopic physical structure of the material itself, but instead, the at least part of the material of the housing is configured by a manufacturing or processing process, such as the 3D printing technology or additive manufacturing technology described above, such that the at least part of the material forms a structure similar to bone, wood, etc., having many micro-lattices or joints, or a honeycomb-like structure. According to the present invention, the lattice structure units of the housing are preferably made by additive manufacturing, and therefore, the dimension of the lattice structure units may be designated as desired. In a preferred embodiment, the lattice structure units are configured to have a size on the order of micrometers.

Figure 3:
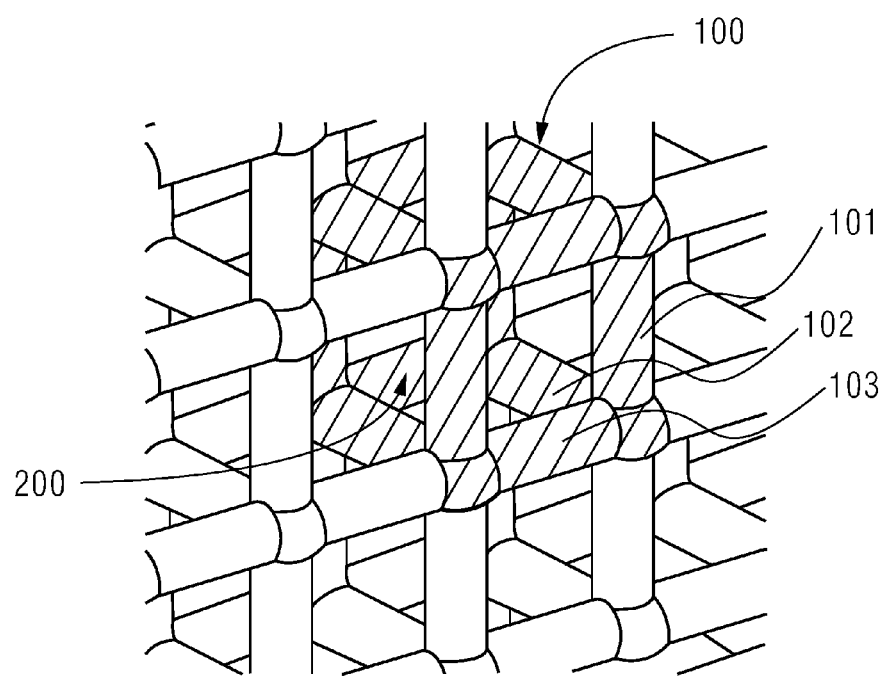
FIG. 3 is an enlarged schematic diagram of 2A in FIG. 2.

In practical applications, the plurality of lattice structure units may be uniformly distributed in the at least part of the material of the housing. For example, as shown in FIG. 3, the plurality of lattice structure units are uniformly distributed in the at least part of the material of the housing in a joined manner. Since the lattice structure units are uniformly distributed in the at least part of the material, the performance (e.g., heat dissipation performance, rigidity-weight ratio, etc.) of the at least part of the material exhibits uniformity and consistency.

In practical applications, the lattice structure units may be configured as a polyhedron, such as a tetrahedron or a hexahedron. More preferably, these polyhedrons are equilateral polyhedron. Each lattice structure unit is formed by connecting a plurality of bar-like structure portions. Since the plurality of bar-like structure portions may form a tetrahedron, a hexahedron or even an octahedron, each lattice structure unit may be a tetrahedral lattice structure unit, a hexahedral lattice structure unit or even an octahedral lattice structure unit. As shown in FIG. 3, the housing includes a plurality of connected hexahedral lattice structure units (particularly, an equilateral hexahedron), where one lattice structure unit 100 includes four same-direction bar-like structure portions 101, four same-direction bar-like structure portions 102, and four same-direction bar-like structure portions 103. The hexahedron includes four vertices, and each vertex is connected to three bar-like structure portions 101, 102, and 103 through a joint 104, that is, the three bar-like structure portions are joined at the vertex. Moreover, portions other than bar-like structure portions are hollow. That is to say, the interior 200 of the lattice structure unit 100 is hollow, such that a thermally conductive medium may be filled in the interior 200 of the lattice structure unit 100. It is necessary to seal the lattice structure unit when filling the thermally conductive medium. For example, an inner surface portion of the housing is configured to include a plurality of lattice structure units. In this case, a sealing layer may be provided on the entire inner surface of the housing to seal the thermally conductive medium inside the housing.

In practical applications, due to the fact that a heat generating component such as a motor may be accommodated in the housing of the joint, the inner surface portion of housing in contact with or near the heat generating component may be configured to include the plurality of lattice structure units. That is, the at least part of the material of the housing is the inner surface portion of the housing that is at least in contact with the heat generating component, for example, a predetermined thickness of material of the inner surface of the housing is configured to include a plurality of lattice structure units. Thus, the heat dissipation performance of the at least part of the material is better relative to the solid structure, and therefore, the heat dissipation performance of the housing is improved. Further, a thermally conductive medium may be sealed in each lattice structure unit. As shown in FIG. 3, the thermally conductive medium is filled in the interior of the hexahedral lattice, thereby further improving thermal conductivity of the housing. The thermally conductive medium may be, for example, water or a cooling fluid.

The present invention provides a housing of a joint of a collaborative robot. Since the at least part of the material of the housing is configured to include the plurality of lattice structure units, the weight of the joint may be reduced with respect to a completely solid housing.

On the other hand, the present invention provides a joint of a collaborative robot, where the joint comprises the housing.

It may be understood that the joint of the collaborative robot provided here uses the housing, and the at least part of the material of the housing is configured to include the plurality of lattice structure units, and therefore, the weight of the joint may be reduced with respect to a completely solid housing.

Figure 2:
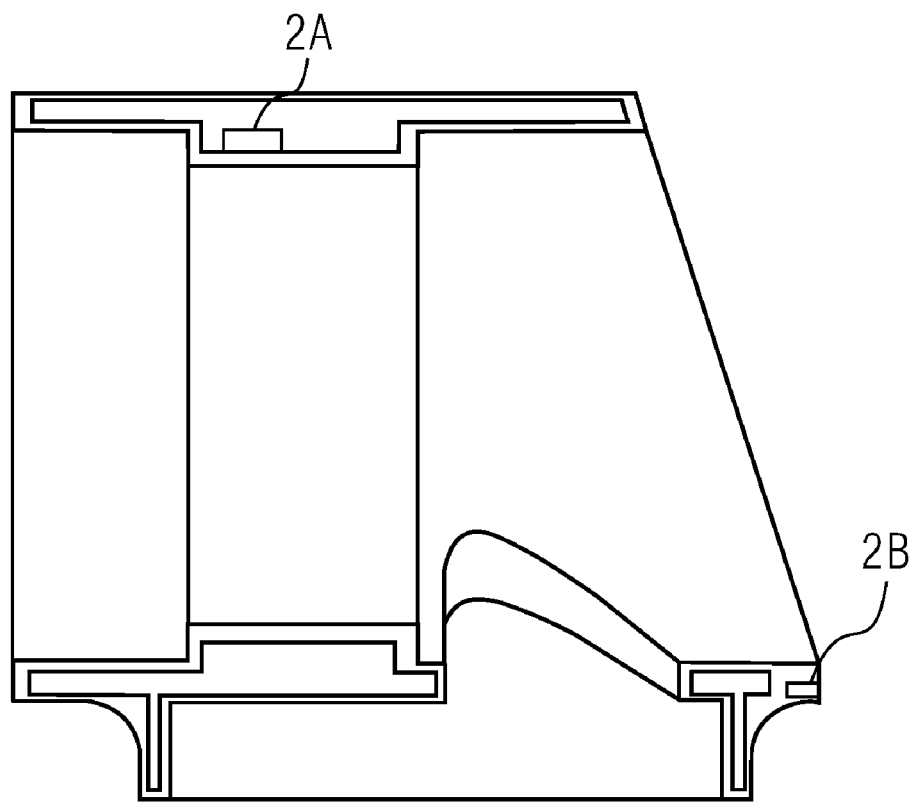
FIG. 2 is a schematic diagram of a brief structure of a joint of a collaborative robot according to an embodiment of the present invention.
Figure 4:
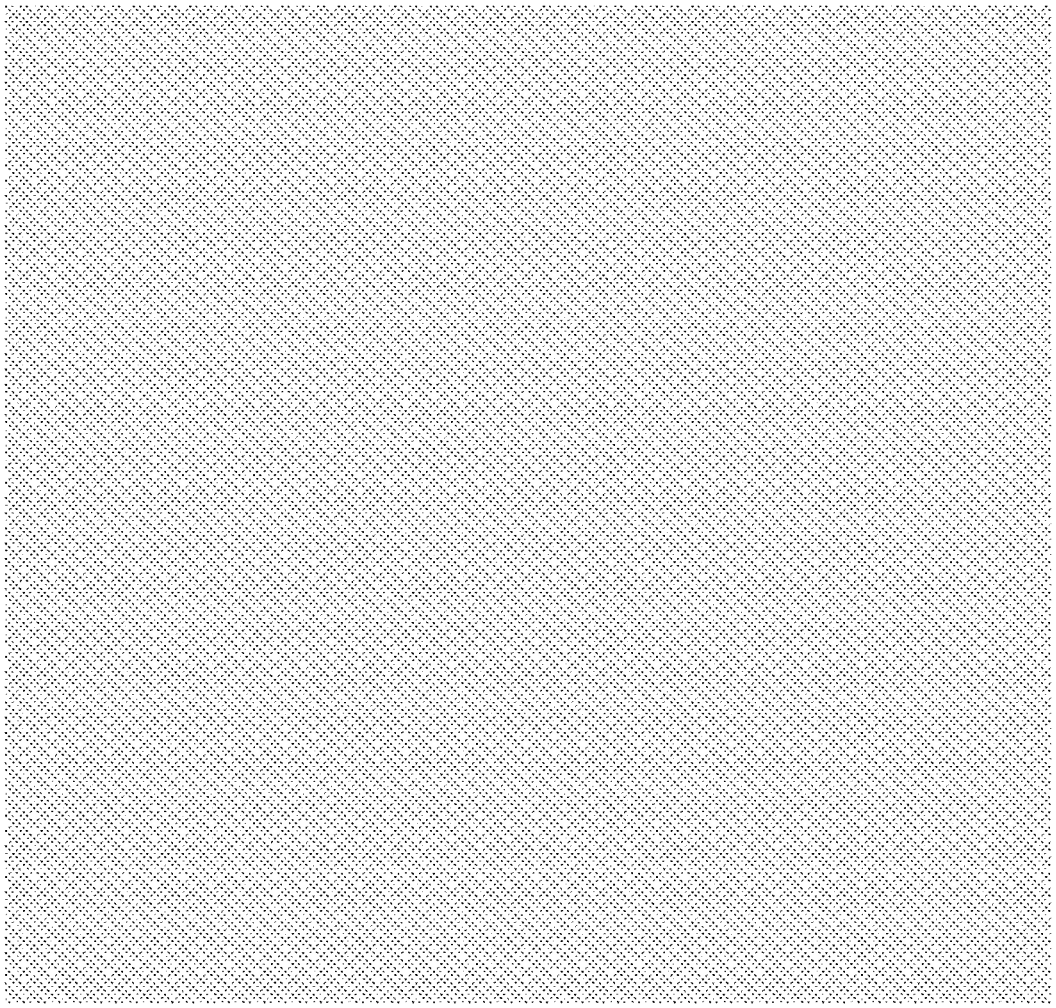
FIG. 4 is an enlarged schematic diagram of 2B in FIG. 2.

For example, FIG. 1 illustrates a joint 10 of a collaborative robot provided in the present invention, where the joint 10 includes a housing 2, a harmonic gear 1, a motor 3, an electrical component 4, and a rear cover 5. The housing 2 of the joint may be an aluminum alloy material and is an integral structure made by a 3D printing technology. Referring to FIG. 2, an outer surface portion of the housing is configured as a solid structure 2B, and the details of the solid structure 2B can be seen in FIG. 4; the inner surface portion of the housing is configured to include a plurality of lattice structure units, namely, a lattice structure 2A, the detailed structure of the lattice structure 2A can be seen in FIG. 3, and water or other thermally conductive fluids with a cooling effect is sealed in each lattice structure unit.

It may be understood that the inner surface portion and the outer surface portion of the housing are two surfaces of the housing, where the inner surface portion is a portion of the housing closer to the inner surface of the housing, and the outer surface portion is a portion of the housing closer to the outer surface of the housing.

Due to the fact that the inner surface portion of the housing is the lattice structure 2A, and the housing is an integral structure made by the 3D printing technology, the housing has a high rigidity-weight ratio. By setting the inner surface portion of the housing into the lattice structure, the weight of the housing may be reduced by at least 30% with respect to the weight of the housing with a completely solid structure.

It may be understood that the solid structure does not mean a microscopic physical structure of the material itself, but means that the outer surface portion of the housing is configured as a non-hollow structure. Of course, a lattice may be included in a microscopic physical structure of the material of a solid or lattice structure, but such a lattice is a feature of the material itself, unlike a lattice in the inner surface portion of the housing. The lattice in the inner surface portion of the housing is formed by the 3D printing technology, and the dimension thereof may be determined according to specific situations, for example, each lattice has a size on the order of micrometers.

The manufacturing process of the lattice structure in which the thermally conductive medium is filled includes: after manufacturing the lattice structure, pumping out air in each cavity of the lattice structure, and filling the thermally conductive medium therein and then sealing the cavity, so that the housing itself becomes a hot chamber with super thermal conductivity.

The joint includes two heat generating components, i.e., a harmonic gear 1 and a motor 3.

The function of the harmonic gear 1 is to convert a motor rotor from high-speed rotation to low-speed rotation, and a flange thereof outputs a high torque. The efficiency of the harmonic gear 1 under grease lubrication and in a predetermined operating state is between 60% and 80%, whereby in most states, the thermal power of the harmonic gear 1 may reach 100 W or even more.

If the inner surface portion of the housing is a solid structure, heat generated by the harmonic gear 1 is mainly concentrated on an area of the inner surface portion in contact with or near the harmonic gear 1, so that the area of the inner surface portion in contact or near the harmonic gear 1 is a hot area. However, the inner surface portion of the housing in the present invention is a lattice structure, and therefore, the heat generated by the harmonic gear 1 may diffuse to the entire housing, thereby facilitating heat dissipation.

The motor 3 is also a large heat generating device, and with its function being providing power for the action of the joint.

If the inner surface portion of the housing is a solid structure, heat generated by the motor 3 is mainly concentrated on an area of the inner surface portion in contact with or near the motor 3, so that the area of the inner surface portion in contact or near the motor 3 is also a hot area. However, the inner surface portion of the housing in the present invention is a lattice structure, and therefore, the heat generated by the motor 3 may diffuse to the entire housing, thereby facilitating heat dissipation.

The electrical component 4 is a component with less heat generation and is connected to the motor 3. The specific structure of the electrical component 4 includes a control driving plate, an encoder, and a braking system, and control on the motor is realized through cooperation of the electrical components. These electrical components generate less heat.

The rear cover 5 and the housing 2 form a cavity for accommodating the joint portion. The rear cover 5 may be made of a non-metallic material, and therefore, the rear cover 5 may be arranged at a position with less heat generation, i.e., a position corresponding to the electrical component 4, so that the use amount of metals may be reduced, and the costs of the joint may be reduced.

The lattice structure is arranged in the inner surface portion of the housing in contact with the heat generating component, and the thermally conductive medium is sealed in each lattice, such that the housing becomes a hot chamber with super thermal conductivity, and heat is easily transferred from a local hot point to the entire housing. That is to say, the heat generated by the heat generating component may be conducted to the entire housing, so that the thermally conductive efficiency of the joint is improved. As the thermally conductive efficiency is improved, the service life and performance of the joint are improved, and then the market competitiveness of the collaborative robot is improved.

The above descriptions are merely preferred embodiments of the present invention and are not intended to limit the present invention. Any modification, equivalent replacement, or improvement made within the spirit and principle of the present invention shall fall within the scope of protection of the present invention.

The invention claimed is:

1. A housing of a joint of a collaborative robot, the housing comprising:
   an outer surface portion;
   an inner surface portion opposite the outer surface portion, the outer surface portion and the inner surface portion being formed as an integral structure using an additive manufacturing process, at least part of the inner surface portion being formed by the additive manufacturing process so that the additive manufacturing process produces a lattice structure having a cavity, at least part of the outer surface portion being formed by the additive manufacturing process so as to be a solid structure; and
   a thermally conductive medium sealed within the cavity of the lattice structure of the inner surface portion, the conductive medium being a fluid.

2. The housing according to claim 1, wherein the lattice structure of the inner surface portion comprises a plurality of lattice structure units that are uniformly distributed and that at least partially bound the cavity.

3. The housing according to claim 2, wherein the plurality of lattice structure units are distributed in a joining manner.

4. The housing according to claim 2, wherein each of the plurality of lattice structure units is a polyhedron formed by connecting a plurality of elongated bar structure portions.

5. The housing according to claim 4, wherein each of the plurality of lattice structure units is a tetrahedral lattice structure unit or a hexahedral lattice structure unit formed of the plurality of bar structure portions.

6. The housing according to claim 2, wherein each of the plurality of lattice structure units has a size on the order of micrometers.

7. The housing according to claim 1, wherein the inner surface portion of the housing comprised of the lattice structure is in contact with or is adjacent to a heat generating component.

8. A joint of a collaborative robot, the joint comprising:
   the housing according to claim 1; and a harmonic gear, a motor, or an electrical component disposed within the housing.

9. The housing according to claim 1, wherein the outer surface portion and the inner surface portion are each comprised of an aluminum alloy.

10. The housing according to claim 1, wherein the thermally conductive medium comprises water.

11. The housing according to claim 1, further comprising a seal disposed over at least a portion of the interior surface portion so as to seal the thermally conductive medium within the cavity of the lattice structure.

12. The housing according to claim 1, wherein the lattice structure of the inner surface portion comprises a plurality of interconnected bar structure portions that at least partially bound the cavity.

* * * * *